(12) United States Patent
White et al.

(10) Patent No.: US 7,332,548 B2
(45) Date of Patent: Feb. 19, 2008

(54) PROCESS FOR PRODUCTION OF A POLYESTER PRODUCT FROM ALKYLENE OXIDE AND CARBOXYLIC ACID

(75) Inventors: Alan Wayne White, Kingsport, TN (US); Michael Paul Ekart, Kingsport, TN (US); Larry Cates Windes, Kingsport, TN (US); Richard Gill Bonner, Kingsport, TN (US); Alan George Wonders, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 348 days.

(21) Appl. No.: 10/793,384

(22) Filed: Mar. 4, 2004

(65) Prior Publication Data

US 2005/0197468 A1   Sep. 8, 2005

(51) Int. Cl.
 C08G 63/02 (2006.01)
(52) U.S. Cl. .................. 525/437; 528/272; 528/274; 528/297
(58) Field of Classification Search ............... 560/8; 525/437, 272, 274, 297; 528/271–272, 366, 528/274, 297
See application file for complete search history.

(56) References Cited

U.S. PATENT DOCUMENTS

| | | | |
|---|---|---|---|
| 2,361,717 A | 10/1944 | Taylor | |
| 2,709,642 A | 5/1955 | Mann, Jr. et al. | |
| 2,753,249 A | 7/1956 | Idenden et al. | |
| 2,808,428 A * | 10/1957 | Hotten | 560/96 |
| 2,829,153 A | 4/1958 | Vodonik | |
| 2,867,650 A * | 1/1959 | Van Lohuizen et al. | 560/92 |
| 2,905,707 A | 9/1959 | Hurt et al. | |
| 2,937,197 A * | 5/1960 | Kakzschmann | 560/92 |
| 2,973,341 A | 2/1961 | Hippe et al. | |
| 3,044,993 A | 7/1962 | Tiemersma | |
| 3,052,711 A * | 9/1962 | Weir et al. | 560/93 |
| 3,054,776 A | 9/1962 | Higgins | |
| 3,110,547 A | 11/1963 | Emmert | |
| 3,113,843 A | 12/1963 | Wen | |
| 3,140,309 A * | 7/1964 | Ardis et al. | 560/93 |
| 3,161,710 A | 12/1964 | Turner | |
| 3,185,668 A | 5/1965 | Meyer et al. | |
| 3,192,184 A | 6/1965 | Brill et al. | |
| 3,241,926 A | 3/1966 | Parker et al. | |
| 3,254,965 A | 6/1966 | Ogle | |
| 3,376,353 A | 4/1968 | Tate | |
| 3,385,881 A | 5/1968 | Bachman et al. | |
| 3,402,023 A | 9/1968 | Dobo | |
| 3,414,608 A * | 12/1968 | Fujita et al. | 560/93 |
| 3,427,287 A | 2/1969 | Pengilly | |
| 3,440,309 A * | 4/1969 | Vermeulen et al. | 264/53 |
| 3,442,868 A | 5/1969 | Ogata et al. | |
| 3,458,467 A | 7/1969 | Herrle et al. | |
| 3,459,788 A * | 8/1969 | Enoki et al. | 560/93 |
| 3,468,849 A | 9/1969 | Rothert | |
| 3,480,587 A | 11/1969 | Porter | |
| 3,487,049 A | 12/1969 | Busot | |
| 3,496,146 A | 2/1970 | Mellichamp, Jr. | |
| 3,496,220 A | 2/1970 | McCarty et al. | |
| 3,507,905 A | 4/1970 | Girantet et al. | |
| 3,522,214 A | 7/1970 | Crawford et al. | |
| 3,529,002 A * | 9/1970 | Distler et al. | 554/149 |
| 3,551,396 A | 12/1970 | Lanthier | |
| 3,582,244 A | 6/1971 | Siclari et al. | |
| 3,590,070 A | 6/1971 | Martin et al. | |
| 3,590,072 A | 6/1971 | Leybourne, III | |
| 3,595,846 A | 7/1971 | Rouzier | |
| 3,600,137 A | 8/1971 | Girantet et al. | |
| 3,609,125 A | 9/1971 | Fujimoto | |
| 3,639,448 A | 2/1972 | Matsuzawa | |
| 3,644,096 A | 2/1972 | Lewis et al. | |
| 3,644,294 A | 2/1972 | Siclari et al. | |
| 3,644,483 A | 2/1972 | Griehl et al. | |
| 3,646,102 A | 2/1972 | Kobayashi et al. | |
| 3,647,758 A | 3/1972 | Ryffel et al. | |
| 3,651,125 A | 3/1972 | Lewis et al. | |
| 3,684,459 A | 8/1972 | Tate et al. | |
| 3,689,461 A | 9/1972 | Balint et al. | |
| 3,697,579 A | 10/1972 | Balint et al. | |
| 3,714,125 A | 1/1973 | Shima et al. | |
| 3,723,391 A | 3/1973 | Beer et al. | |
| 3,740,267 A | 6/1973 | Haylock et al. | |
| 3,781,213 A | 12/1973 | Siclari et al. | |
| 3,819,585 A | 6/1974 | Funk et al. | |
| 3,849,379 A | 11/1974 | Jeurissen et al. | |
| 3,867,349 A | 2/1975 | Heeg et al. | |
| 3,892,798 A | 7/1975 | Heeg et al. | |
| 3,927,983 A | 12/1975 | Gordon et al. | |
| 3,960,820 A | 6/1976 | Pinney | |

(Continued)

FOREIGN PATENT DOCUMENTS

BE       780142       9/1972

(Continued)

OTHER PUBLICATIONS

Anfinogentov, A.A et al, Reaction of terephthalic acid with ethylenen oxide in dimethyl terephthalate, Zhurnal Prikladnoi Khimii, 1978, 51(3), 710-713.*

(Continued)

Primary Examiner—Randy Gulakowski
Assistant Examiner—A. Toscano
(74) Attorney, Agent, or Firm—Steven A. Owen; Bernard J. Graves, Jr.

(57) ABSTRACT

A process to produce polyester product from alkylene oxide and carboxylic acid. More specifically this process relates to a process to produce polyethylene terephthalate where terephthalic acid and ethylene oxide are reacted to form a partially esterified terephthalic acid product and then the partially esterified product is further reacted with ethylene glycol to produce polyethylene terephthalate.

47 Claims, No Drawings

U.S. PATENT DOCUMENTS

| | | | |
|---|---|---|---|
| 3,988,301 A | 10/1976 | Jeurissen et al. | |
| 4,001,187 A | 1/1977 | Itabashi et al. | |
| 4,008,048 A | 2/1977 | Hellemans et al. | |
| 4,020,049 A | 4/1977 | Rinehart | |
| 4,028,307 A | 6/1977 | Ure | |
| 4,046,718 A | 9/1977 | Mass et al. | |
| 4,049,638 A | 9/1977 | Doerfel et al. | |
| 4,056,514 A | 11/1977 | Strehler et al. | |
| 4,064,112 A | 12/1977 | Rothe et al. | |
| 4,077,945 A | 3/1978 | Heinze et al. | |
| 4,079,046 A | 3/1978 | Brignac et al. | |
| 4,089,888 A | 5/1978 | Tokomitsu et al. | |
| 4,097,468 A | 6/1978 | James et al. | |
| 4,100,142 A | 7/1978 | Schaefer et al. | |
| 4,110,316 A | 8/1978 | Edging et al. | |
| 4,118,582 A | 10/1978 | Walker | |
| 4,122,112 A | 10/1978 | Koda et al. | |
| 4,146,729 A | 3/1979 | Goodley et al. | |
| 4,204,070 A | 5/1980 | Suzuki et al. | |
| 4,212,963 A | 7/1980 | Lehr et al. | |
| 4,223,124 A | 9/1980 | Broughton et al. | |
| 4,230,818 A | 10/1980 | Broughton, Jr. et al. | |
| 4,235,844 A | 11/1980 | Strezel et al. | |
| 4,238,593 A | 12/1980 | Duh | |
| 4,254,246 A | 3/1981 | Dicoi et al. | |
| 4,289,871 A | 9/1981 | Rowan et al. | |
| 4,289,895 A | 9/1981 | Burkhardt et al. | |
| 4,314,071 A * | 2/1982 | Babler | 560/127 |
| 4,339,570 A | 7/1982 | Muschelknautz et al. | |
| 4,346,193 A | 8/1982 | Warfel | |
| 4,361,462 A | 11/1982 | Fujii et al. | |
| 4,365,078 A | 12/1982 | Shelley | |
| 4,382,139 A | 5/1983 | Kapteina et al. | |
| 4,383,093 A | 5/1983 | Shiraki et al. | |
| 4,410,750 A | 10/1983 | Langer, Jr. | |
| 4,440,924 A | 4/1984 | Kuze et al. | |
| 4,452,956 A | 6/1984 | Moked et al. | |
| 4,472,558 A | 9/1984 | Casper et al. | |
| 4,499,226 A | 2/1985 | Massey et al. | |
| 4,542,196 A | 9/1985 | Morris et al. | |
| 4,548,788 A | 10/1985 | Morris et al. | |
| 4,550,149 A | 10/1985 | Morris et al. | |
| 4,551,309 A | 11/1985 | Morris et al. | |
| 4,551,510 A | 11/1985 | Morris et al. | |
| 4,554,343 A | 11/1985 | Jackson, Jr. et al. | |
| 4,555,384 A | 11/1985 | Morris et al. | |
| 4,612,363 A | 9/1986 | Sasaki et al. | |
| 4,670,580 A | 6/1987 | Maurer | |
| 4,675,377 A | 6/1987 | Mobley et al. | |
| 4,680,376 A | 7/1987 | Heinze et al. | |
| 4,721,575 A | 1/1988 | Binning et al. | |
| 4,952,627 A | 8/1990 | Morita et al. | |
| 4,973,655 A | 11/1990 | Pipper et al. | |
| 5,041,525 A | 8/1991 | Jackson | |
| 5,064,935 A | 11/1991 | Jackson et al. | |
| 5,162,488 A | 11/1992 | Mason | |
| 5,185,426 A | 2/1993 | Verheijen et al. | |
| 5,194,525 A | 3/1993 | Miura et al. | |
| 5,243,022 A | 9/1993 | Kim et al. | |
| 5,254,288 A | 10/1993 | Verheijen et al. | |
| 5,294,305 A | 3/1994 | Craft, Sr. et al. | |
| 5,300,626 A | 4/1994 | Jehl et al. | |
| 5,340,906 A | 8/1994 | Shirokura et al. | |
| 5,340,907 A | 8/1994 | Yau et al. | |
| 5,384,389 A | 1/1995 | Alewelt et al. | |
| 5,385,773 A | 1/1995 | Yau et al. | |
| 5,413,861 A | 5/1995 | Gallo | |
| 5,464,590 A | 11/1995 | Yount et al. | |
| 5,466,419 A | 11/1995 | Yount et al. | |
| 5,466,765 A | 11/1995 | Hasseltine et al. | |
| 5,466,776 A | 11/1995 | Krautstrunk et al. | |
| 5,478,909 A | 12/1995 | Jehl et al. | |
| 5,480,616 A | 1/1996 | Richardson et al. | |
| 5,484,882 A | 1/1996 | Takada et al. | |
| 5,496,469 A | 3/1996 | Scraggs et al. | |
| 5,519,112 A | 5/1996 | Harazoe et al. | |
| 5,573,820 A | 11/1996 | Harazoe et al. | |
| 5,594,077 A | 1/1997 | Groth et al. | |
| 5,602,216 A | 2/1997 | Juvet | |
| 5,648,437 A | 7/1997 | Fischer et al. | |
| 5,681,918 A | 10/1997 | Adams et al. | |
| 5,688,898 A | 11/1997 | Bhatia | |
| 5,739,219 A | 4/1998 | Fischer et al. | |
| 5,753,190 A | 5/1998 | Hasseltine et al. | |
| 5,753,784 A | 5/1998 | Fischer et al. | |
| 5,786,443 A | 7/1998 | Lowe | |
| 5,811,496 A | 9/1998 | Iwasyk et al. | |
| 5,830,981 A | 11/1998 | Koreishi et al. | |
| 5,849,849 A | 12/1998 | Bhatia | |
| 5,898,058 A | 4/1999 | Nichols et al. | |
| 5,902,865 A | 5/1999 | Gausepohl et al. | |
| 5,905,096 A | 5/1999 | Lay et al. | |
| 5,922,828 A | 7/1999 | Schiraldi | |
| 5,932,105 A | 8/1999 | Kelly | |
| 6,069,228 A | 5/2000 | Alsop et al. | |
| 6,096,838 A | 8/2000 | Nakamoto et al. | |
| 6,100,369 A | 8/2000 | Miyajima et al. | |
| 6,103,859 A * | 8/2000 | Jernigan et al. | 528/307 |
| 6,111,035 A | 8/2000 | Sakamoto et al. | |
| 6,111,064 A | 8/2000 | Maurer et al. | |
| 6,113,997 A | 9/2000 | Massey et al. | |
| 6,127,493 A | 10/2000 | Maurer et al. | |
| 6,174,970 B1 | 1/2001 | Braune | |
| 6,204,386 B1 * | 3/2001 | Schiraldi et al. | 546/304 |
| 6,355,738 B2 | 3/2002 | Nakamachi | |
| 6,355,830 B1 * | 3/2002 | Sakano et al. | 560/190 |
| 6,359,106 B1 | 3/2002 | Nakamoto et al. | |
| 6,703,454 B2 | 7/2002 | Debruin | |
| 6,623,643 B2 | 9/2003 | Chisholm et al. | |
| 6,815,525 B2 | 11/2004 | DeBruin | |
| 2002/0128399 A1 | 9/2002 | Makamoto et al. | |
| 2002/0137877 A1 | 9/2002 | Debruin | |
| 2002/0180099 A1 | 12/2002 | Keillor, III | |
| 2003/0037910 A1 | 2/2003 | Smymov | |
| 2003/0133856 A1 | 7/2003 | Le | |
| 2004/0044170 A1 | 3/2004 | DeBruin | |
| 2004/0249111 A1 | 12/2004 | Debruin et al. | |
| 2004/0249112 A1 | 12/2004 | Debruin et al. | |

FOREIGN PATENT DOCUMENTS

| | | |
|---|---|---|
| DE | 2 200 832 | 7/1973 |
| DE | 125 798 | 5/1977 |
| DE | 126 073 | 7/1977 |
| DE | 206 558 | 2/1984 |
| DE | 229 415 A1 | 11/1985 |
| DE | 4235785 | 5/1994 |
| EP | 0 070 707 A1 | 1/1983 |
| EP | 0 850 962 A2 | 1/1998 |
| EP | 0 999 228 A2 | 10/2000 |
| EP | 1 065 193 A1 | 3/2001 |
| FR | 2 302 778 A1 | 10/1976 |
| GB | 777128 | 8/1954 |
| GB | 1154538 | 6/1965 |
| GB | 1001787 | 8/1965 |
| GB | 1013034 | 12/1965 |
| GB | 2010294 | 6/1979 |
| GB | 2052535 | 1/1981 |
| JP | 42 4993 B | 3/1967 |
| JP | 42 18353 B | 9/1967 |
| JP | 47 39043 A | 12/1972 |
| JP | 48 94795 A | 12/1973 |
| JP | 49 28698 A | 3/1974 |
| JP | 49 34593 A | 3/1974 |

| | | | |
|---|---|---|---|
| JP | 49 105893 A | 10/1974 | |
| JP | 50 82197 A | 7/1975 | |
| JP | 51 29460 A | 3/1976 | |
| JP | 52 78845 A | 7/1977 | |
| JP | 52 87133 A | 7/1977 | |
| JP | 53 31793 A | 3/1978 | |
| JP | 53 34894 A | 3/1978 | |
| JP | 54 41833 A | 4/1979 | |
| JP | 54 76535 A | 6/1979 | |
| JP | 54 79242 A | 6/1979 | |
| JP | 54 100494 A | 8/1979 | |
| JP | 54 157536 A | 12/1979 | |
| JP | 55 43128 A | 3/1980 | |
| JP | 55 108422 A | 8/1980 | |
| JP | 55 135133 A | 10/1980 | |
| JP | 59 47226 A | 3/1984 | |
| JP | 59 68326 A | 4/1984 | |
| JP | 59 71326 A | 4/1984 | |
| JP | 60 15421 A | 1/1985 | |
| JP | 60 115551 | 6/1985 | |
| JP | 60 226846 A | 11/1985 | |
| JP | 62 207325 | 9/1987 | |
| JP | 62 292831 | 12/1987 | |
| JP | 1 102044 | 4/1989 | |
| JP | 3 192118 | 8/1991 | |
| JP | 5 78402 A | 3/1993 | |
| JP | 7 118208 A | 10/1993 | |
| JP | 7 238151 A | 9/1995 | |
| JP | 8 198960 A | 8/1996 | |
| JP | 8 283398 A | 10/1996 | |
| JP | 1998/259244 A | 9/1998 | |
| JP | 11 106489 | 4/1999 | |
| JP | 1999/092555 A | 4/1999 | |
| JP | 2000/095851 A | 4/1999 | |
| KR | 1993 0005144 B1 | 6/1993 | |
| KR | 1994 0011540 B1 | 12/1994 | |
| NL | 6704303 | 9/1967 | |
| PL | 136 188 | 8/1987 | |
| SU | 973552 | 11/1982 | |
| WO | WO 96/22318 | 7/1996 | |
| WO | WO 98/08602 A1 | 3/1998 | |
| WO | WO 98/10007 A1 | 3/1998 | |
| WO | WO 99/16537 A1 | 4/1999 | |
| WO | WO 02/26841 A1 | 4/2002 | |
| WO | WO 03/006526 A1 | 1/2003 | |

OTHER PUBLICATIONS

Stahl, Wegmann, Von Rohr; Tubular reactor for liquid reactions with gas release; Catalysis Today 79-80; 2003 pp. 89-95.

Perry, Robert H. and Green, Don, "Flow in Pipes and Channels", Perry's Chemical Engineer's handbook, (1984), pp. 5-23, 6$^{th}$ Edition, McGraw-Hill, United States.

Perry, Robert H. and Green, Don, "Fluid and Particle Mechanics", Perry's Chemical Engineer's Handbook, (1984),5-40 to 5-41, 6$^{th}$ Edition, McGraw-Hill, United States.

Nauman, E.B., "Enhancement of Heat Transfer and Thermal Homogenity with Motionless Mixers", American Institute of Chemical Engineer's Journal, (1979), pp. 246-258, vol. 25, No. 2.

Brodkey, Robert S., "Multiphase Phenomena I: Pipe Flow" The Phenomena of Fluid Motions, (1967), pp. 456-538, Addison-Wesley Publishing Company, United States.

Gupta, S.K. and Kumar, Anil, "Polyester Reactors", Plenum Chemical Engineering Series, (1987), pp. 241-318, Chapter 8, Plenum Press, New York.

\* cited by examiner

PROCESS FOR PRODUCTION OF A POLYESTER PRODUCT FROM ALKYLENE OXIDE AND CARBOXYLIC ACID

FIELD OF INVENTION

This invention relates to a process to produce a polyester product from alkylene oxide and carboxylic acid. More specifically this invention relates to a process to produce polyethylene terephthalate (PET) from ethylene oxide and terephthalic acid (TPA). Even more specifically, this process relates to a process to produce PET by reacting terephthalic acid and ethylene oxide in the presence of a catalyst and a solvent to form a partially esterified terephthalic acid product. The partially esterified terephthalic acid product is further reacted with a minimal amount of ethylene glycol to produce PET.

BACKGROUND OF THE INVENTION

Thermoplastic polyesters are step growth polymers that are useful when made at high molecular weights. The first step in a common method of producing a polyester or copolyester, such as polyethylene terephthalate, is an esterification or ester-exchange stage where a diacid, typically terephthalic acid, or a diester, typically dimethylterephthalate, reacts with an appropriate diol, typically ethylene glycol, to give a bis(hydroxyalkyl)ester and some oligomers. Water or alcohol is evolved at this stage and is usually removed by fractional distillation.

Pursuant to the goal of making polyethylene terephthalate and other polyesters, a great deal of patent literature is dedicated to describing processes for preparing terephthalic acid/ethylene glycol mixtures suitable as starting materials. In general, these inventions describe specific mixing schemes with a purified terephthalic acid solid and liquid ethylene glycol as starting materials. Additionally, there is a substantial body of literature devoted to producing a purified terephthalic acid in the powder form that is suitable for use in producing PET.

In the present invention, a process to produce polyethylene terephthalate from ethylene oxide and terephthalic acid is provided. Terephthalic acid and ethylene oxide are reacted to form a partially esterified terephthalic acid product. The partially esterified terephthalic acid product for example is subsequently reacted with ethylene glycol in a conventional polyethylene terephthalic process or through the use of a pipe reactor to produce polyethylene terephthalate.

The use of ethylene oxide can be a preferred method over using ethylene glycol. In addition, less heat input can be required during esterification using ethylene oxide versus using ethylene glycol. The polycondensation step can be conducted in one or more stages and can be completed with ethylene glycol addition, if needed, in order to increase the rate and to control the mole ratio. Suitable catalysts and additives can be added prior to or during polycondensation. Possible catalysts include compounds based on Sb, Ge, Ti, Al, Sn and Zr or combinations thereof.

SUMMARY OF THE INVENTION

It is an object of this invention to provide a process for producing a partially esterified carboxylic acid product by contacting in a reactor zone at least one carboxylic acid with at least one alkylene oxide in the presence of at least one solvent and at least one basic catalyst.

It is another object of this invention to provide a process for producing a partially esterified terephthalic acid product by contacting in a reactor zone terephthalic acid and ethylene oxide in the presence of at least one solvent and at least one basic catalyst.

It is another object of this invention to provide a process to produce polyethylene terephthalate by contacting in a reactor zone terephthalic acid with ethylene oxide in the presence of a solvent and a basic catalyst to produce a partially esterified terephthalic product; and then reacting said partially esterified terephthalic acid product with ethylene glycol to produce polyethylene terephthalate.

In one embodiment of this invention, a process to produce a partially esterified carboxylic acid product is provided. The process comprises contacting in a reactor zone at least one carboxylic acid with at least one alkylene oxide in the presence of at least one solvent and at least one basic catalyst to produce the partially esterified carboxylic acid product; wherein said alkylene oxide is present in a molar ratio ranging from about 0.5:1 to less than 1:1 alkylene oxide to carboxylic acid.

In another embodiment of this invention, a process to produce a partially esterified terephthalic acid product is provided. The process comprises contacting in a reactor zone terephthalic acid with ethylene oxide in the presence of at least one solvent and at least one basic catalyst to produce said partially esterified terephthalic acid product; wherein said ethylene oxide is present in a molar ratio ranging from about 0.5:1 to less than 1:1 ethylene oxide to terephthalic acid.

In another embodiment of this invention, a process to produce a partially esterified terephthalic acid product is provided. The process comprises contacting in a reactor zone terephthalic acid with ethylene oxide in the presence of at least one solvent and at least one basic catalyst to produce said partially esterified terephthalic acid product; wherein said ethylene oxide is present in a molar ratio ranging from about 0.8:1 to 1.2:1 ethylene oxide to terephthalic acid.

In another embodiment of this invention, a process to produce polyethylene terephthalate is provided. The process comprises:

(a) contacting in a reactor zone terephthalic acid with ethylene oxide in the presence of a solvent and a basic catalyst to produce a partially esterified terephthalic acid product; wherein said ethylene oxide is present in less than 1:1 molar ratio of ethylene oxide to terephthalic acid;

(b) reacting said partially esterified terephthalic acid product with ethylene glycol to produce said polyethylene terephthalate.

In another embodiment of this invention, a process to produce a partially esterified terephthalic acid product is provided. The process comprises contacting in a reactor zone terephthalic acid with ethylene oxide in the presence of a xylene, oligomeric polyester or toulene and triethylamine to produce said partially esterified terephthalic acid product; wherein said ethylene oxide is present in a molar ratio of 0.5:1 to less than 1:1 ethylene oxide to terephthalic acid; wherein said reactor zone comprises at least one reactor operated at a pressure such that a substantial portion of the ethylene oxide is in a liquid phase; wherein said reactor is operated at a temperature of about 120° C. to about 280° C.

In another embodiment of this invention, a process to produce a partially esterified terephthalic acid product is provided. The process comprises contacting in a reactor zone terephthalic acid with ethylene oxide in the presence of xylene, oligomeric polyester or toluene and triethylamine to produce said partially esterified terephthalic acid product;

wherein said ethylene oxide is present in a molar ratio of 0.8:1 to less than 1:1 ethylene oxide to terephthalic acid; wherein said reactor zone comprises at least one reactor operated at a pressure such that a substantial portion of the ethylene oxide is in a liquid phase; and wherein said reactor is operated at a temperature of about 120° C. to about 280° C.

These objects, and other objects, will become more apparent to others with ordinary skill in the art after reading this disclosure.

DETAILED DESCRIPTION OF THE INVENTION

In one embodiment of this invention, a process to produce a partially esterified carboxylic acid product is provided. The process comprises contacting in a reactor zone at least one carboxylic acid with at least one alkylene oxide in the presence of a solvent and at least one basic catalyst to produce said partially esterified carboxylic acid product; wherein said alkylene oxide is present in a molar ratio ranging from about 0.5:1 to less than 1:1 alkylene oxide to carboxylic acid.

The alkylene oxides are selected from the group consisting of ethylene oxide, propylene oxide, butylene oxide or mixtures thereof. Preferably, the alkylene oxide is ethylene oxide.

Suitable carboxylic acids include any chemical compound containing at least two carboxylic acid groups. For example, carboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Other examples of suitable carboxylic acids include, but are not limited to, terephthalic acid, isophthalic acid, trimellitic acid, naphthalenedicarboxylic acid, cyclohexanedicarboxylic acid, cyclohexanediacetic acid, diphenyl-4,4'-dicarboxylic acid, diphenyl-3,4'-dicarboxylic acid, succinic acid, glutaric acid, adipic acid, azelaic acid, sebacic acid, and mixtures thereof.

Suitable solvents include, but are not limited to, toluene, xylene, methyl benzoate, ethyl benzoate, heptane, cyclohexane, and other cyclic and acyclic hydrocarbons with 6 to 16 carbon atoms, benzene, methyl ethyl ketone, other ketones with 5 to 7 carbon atoms such as methyl isopropyl ketone, 3-pentanone (diethyl ketone), 3,3 dimethyl 2-butanone, ethyl isopropyl ketone, methyl isobutyl ketone, 3-hexanone, 3-heptanone, diisopropyl ketone, chlorobenzene and other chlorinated aromatic hydrocarbons, and oligomeric polyesters and the like, and mixtures thereof. Preferably, the solvent is oligomeric polyesters, xylene or toluene.

A basic catalyst results in a pH greater than 8 when 1 gram of the catalyst is dissolved in 100 ml of water. Examples of suitable basic catalysts include, but are not limited to, primary, secondary, and tertiary amines, benzyltrialkyl ammonium hydroxide, alkyl/aryl ammonium hydroxide salts and tetraalkyl ammonium hydroxide salts. The basic catalyst can be triethylamine, tributylamine, trimethylamine, tripropylamine, tributylamine, diisopropylamine, diisopropylethylamine, tetramethyl ammonium hydroxide, benzyltrialkyl ammonium hydroxide, tetraalkyl ammonium hydroxide or mixtures thereof. Preferably, the basic catalyst is selected from the group consisting of triethylamine and tributylamine. Most preferably, the basic catalyst is triethylamine.

The carboxylic acid, alkylene oxide, solvent and basic catalyst can be charged to the reactor zone separately or mixed in any combination. Preferably, the basic catalyst and ethylene oxide are added in the presence of the carboxylic acid. For the reactor zone, there are no special limitations in the form of construction thereof. However, the reactor zone is subject to an arrangement that allows contact of the alkylene oxide, carboxylic acid, solvent and basic catalyst at the given process conditions. Generally the reactor zone comprises at least one reactor. Preferably, the reactor zone comprises a plug flow reactor where the ending temperature is about 180° C. to about 280° C. in order to obtain high reaction rates and near complete conversion of ethylene oxide. Side products such as diethylene glycol(DEG), may be controlled by addition of small amounts of water, and water may be used to insure complete reaction of the ethylene oxide.

The reaction of the carboxylic acid, akylene oxide, solvent, and basic catalyst in the reactor zone is conducted at a temperature of about 120° C. to about 280° C. Preferably, the reaction is conducted at a temperature of about 180° C. to about 280° C. Generally, the reaction is conducted at a pressure of about 100 psi to about 1500 psi. Preferably, the reaction is conducted at a pressure of about 300 psi to about 1500 psi. Most preferably the reaction is conducted at a pressure of about 500 psi to about 1200 psi. In a preferred embodiment of this invention, the reactor zone comprises at least one reactor operated at a pressure such that a substantial portion of the alkylene oxide is in liquid phase. Substantial portion is defined as 90 wt %.

The alkylene oxide is present in a molar ratio ranging from about 0.5:1 to about 1.2:1 alkylene oxide to carboxylic acid. In another range the alkylene oxide is present in a molar ratio ranging from about 0.5:1 to less than 1:1. In another range, the alkylene oxide is present in a molar ratio ranging from about 0.8:1 to less than 1:1.

In the embodiment when the alkylene oxide is ethylene oxide and the carboxylic acid is terephthalic acid and the solvent is toluene, the triethylamine is present in a concentration of about 0.5 to about 5 percent by weight based on the weight of the terephthalic acid. Preferably, the triethylamine is present in a concentration of about 1 to about 5 percent by weight. Most preferably, the triethylamine is present in a concentration of about 1 to about 3 percent by weight. In this embodiment the partially esterified carboxylic acid product is known as a partially esterified terephthalic acid product. The conversion of terephthalic acid to a partially terephthalic acid product is defined as the percent conversion of the acid groups in the terephthalic acid to ester groups. Typically, the conversion is between about 8% to about 60%. Preferably, the conversion is about 30% to about 50%. Most preferably, the conversion is about 40% to about 50%.

The partially esterified carboxylic acid product can be subsequently used to produce a polyester product. This can be accomplished by transferring the partially esterified carboxylic acid product to a conventional type polyester process where esterification and oligomerization can be continued. As used herein, "conventional" process or apparatus with respect to polyester processing refers to a non-pipe reactor or process, including, but not limited to, a continuous stirred tank reactor (CSTR) process or apparatus, a reactive distillation, stripper, or rectification column process or apparatus, or tank with internals, screw, or kneader process or apparatus. The partially esterified carboxylic acid product can also be routed to a non-conventional pipe reactor process as described in U.S. application Ser. No. 10/013,318 filed Dec. 7, 2001 with a publication # 20020137877, herein incorporated by reference.

The polyester ester product comprises at least one polyester. Examples of polyesters include, but are not limited to, homopolymer and copolymers of polyethylene terephthalate (PET); homopolymer and copolymers of polyethylene naphthalate; homopolymer and copolymers of polyethylene isophthalate; homopolymer and copolymers of polyethylene succinate; homopolymer and copolymers of polyethylene adipate and homopolyesters and copolyesters that are usually derived from 1,2-propanediol and 1,2-butanediol and mixtures thereof.

In another embodiment of this invention, a process to produce a partially esterified terephthalic acid product is provided. The process comprises contacting in a reactor zone terephthalic acid with ethylene oxide in the presence of at least one solvent and at least one basic catalyst to produce said partially esterified terephthalic acid product; wherein said ethylene oxide is present in a molar ratio ranging from about 0.5:1 to less than 1:1 ethylene oxide to terephthalic acid.

These components and process steps have been previously described in this disclosure.

In another embodiment of this invention, a process to produce a partially esterified terephthalic acid product is provided. The process comprises contacting in a reactor zone terephthalic acid with ethylene oxide in the presence of at least one solvent and at least one basic catalyst to produce said partially esterified terephthalic acid product; wherein said ethylene oxide is present in 0.8:1 to 1.2:1 molar ratio of ethylene oxide to terephthalic acid.

These components and process steps have been previously described in this disclosure.

In another embodiment of this invention, a process to produce a partially esterified terephthalic acid product is provided. The process comprises:

(a) contacting in a reactor zone terephthalic acid with ethylene oxide in the presence of a solvent and a basic catalyst to produce said partially esterified terephthalic acid product; wherein said ethylene oxide is present in a molar ratio of about 0.5:1 to less than 1:1 ethylene oxide to terephthalic acid; and (b) reacting the partially esterified terephthalic acid product with a diol to produce polyethylene terephthalate.

Step (a) has been previously discussed in this disclosure.

Step (b) can be accomplished by transferring the partially esterified terephthalic acid product to a conventional type PET process where esterification and oligomerization can be continued. As used herein, "conventional" process or apparatus with respect to polyester processing refers to a non-pipe reactor or process, including, but not limited to, a continuous stirred tank reactor (CSTR) process or apparatus, a reactive distillation, stripper, or rectification column process or apparatus, or tank with internals, screw, or kneader process or apparatus.

Suitable diols for producing copolyesters comprise cycloaliphatic diols, preferably having about 6 to about 20 carbon atoms, or aliphatic diols, preferably having about 3 to about 20 carbon atoms. Examples of such diols include, but are not limited to ethylene glycol(EG), diethylene glycol, triethylene glycol, 1,4-cyclohexanedimethanol, propane-1,3-diol, butane-1,4-diol, pentane-1,5-diol, hexane-1, 6-diol, neopentylglycol, 3-methylpentanediol-(2,4), 2-methylpentanediol-(1,4), 2,2,4-trimethylpentane-diol-(1, 3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4 tetramethylcyclobutanediol, 2,2-bis-(3-hydroxyethoxyphenyl)-propane, 2,2-bis-(4-hydroxypropoxyphenyl)-propane, isosorbide, hydroquinone, BDS-(2,2-(sulfonylbis)4,1-phenyleneoxy))bis(ethanol), and the like, and mixtures thereof. Polyesters may be prepared from one or more of the above type diols. Diacids other than terephthalic acid can be included in the process, such as, but not limited to, isophthalic acid, phthalic acid (or anhydride), 2,6- or 2,7-naphthalenedicarboxylic acids, biphenyldicarboxylic acid and stilbenedicarboxylic acid. These acids can be added at any time during the process. Low levels of other additives can also be included in the process, such as ultraviolet absorbers, colorants, reheat agents, antisticking/antiblocking agents, branching agents, processing aids, antioxidants, acetaldehyde and oxygen scavengers, fillers, and the like. Branching agents are compounds containing more than two carboxylic acids, more than two alcohol functions or a combination of both alcohol and carboxylic that totals more than two.

Some examples of PET processes are described in U.S. Pat. Nos. 4,110,316, 4,235,844, and 4,230,818 herein incorporated by reference.

In an alterative embodiment of this invention, the partially esterified terephthalic acid product is transferred to a pipe reactor where the esterification and oligomerization can continue. The pipe reactor process as described in U.S. application Ser. No. 10/013,318 filed Dec. 7, 2001 with a publication # 20020137877 is herein incorporated by reference.

Step (b) can be conducted in one of more stages and can be completed with ethylene glycol added. Suitable catalysts and additives can also be added prior to or during polycondensation. Typical catalysts are compounds containing antimony(III) or titanium (IV). The ethylene glycol that is not reacted into the polyester product can be recycled to an earlier part of the process.

EXAMPLES

This invention can be further illustrated by the following examples of preferred embodiments thereof, although it will be understood that these examples are included merely for purposes of illustration and are not intended to limit the scope of the invention unless otherwise specifically indicated.

Example 1

Use of Different Basic Catalyst

Toluene (400 g), terephthalic acid (40 g) and a basic catalyst were added to a one liter Hastelloy autoclave. The autoclave was purged and pressurized to 100 psi with nitrogen. The autoclave was heated to 260° C., and the pressure was then adjusted to 500 psi with nitrogen. Ethylene oxide (11.5 g) was added at one time to the autoclave from another pressure vessel which was maintained at 700 psi of nitrogen. The temperature of the reaction was maintained at 260° C. for 30 minutes to produce the partially esterified terephthalic acid product. Then the partially esterified TPA product was cooled to ambient temperature. The resulting partially esterified product was filtered and the solid esterified TPA was weighed. The conversions for each of the examples are given in the Table 1 and were measured by $^1$H NMR. A 50% conversion of terephthalic acid would mean approximately a 100% yield based on ethylene oxide.

TABLE 1

| Example # | Basic Catalyst | Wt. of Catalyst | Yield of Solid Esterified TPA | % Conversion | b* | Mole % DEG |
|---|---|---|---|---|---|---|
| 1.1 | Triethylamine | 1.2 g | 38.5 g | 18.0 | 2.18 | 2.6 |
| 1.2 | Triphenylamine | 2.9 g | 39.4 g | 1.4 | 1.18 | 0.0 |
| 1.3 | Triethanolamine | 1.8 g | 38.9 g | 17.5 | 11.27 | 10.8 |
| 1.4 | Diisopropylethylamine | 1.5 g | 37.3 g | 2.3 | 1.77 | 8.4 |
| 1.5 | Trimethylamine | 0.7 g | 41.8 g | 39.2 | 14.05 | 7.0 |
| 1.6 | Benzylamine | 1.2 g | 41.2 g | 12.4 | 8.58 | 9.7 |
| 1.7 | Diisopropylamine | 1.2 g | 35.8 g | 5.2 | 2.27 | 3.5 |
| 1.8 | Benzyltrimethyl ammonium hydroxide | 2.0 g | 40.8 g | 38.1 | 6.32 | 6.9 |
| 1.9 | Benzyltrimethyl ammonium hydroxide | 1.0 g | 40.4 g | 18.6 | 2.26 | 3.9 |
| 1.10 | Benzyltrimethyl ammonium hydroxide | 0.2 g | 40.4 g | 2.4 | 2.26 | 7.1 |
| 1.11 | Tributylamine | 2.2 g | 41.1 g | 10.1 | NA | 1.5 |
| 1.12 | Dimethyldodecylamine | 3.2 g | 35.8 | 24.3 | 5.6 | 5.2 |

The choice of basic catalyst has a significant effect on the conversion of the TPA. The best catalyst for this process would be the one that gives the best conversion while providing a product with low DEG and low b*. The b* is one of the three-color attributes measured on a spectroscopic reflectance-based instrument. A Hunter Ultrascan XE instrument is typically the measuring device. Positive readings signify the degree of yellowness (or absorbance of blue light), while negative readings signify the degree of blueness.

In general, the tertiary amines (triethylamine, triphenylamine, triethanolamine, diisopropyethyleamine, trimethylamine, tributylamine, and dimethyldodecylamine) in the examples above under these conditions give the best results. However, within these, there are clear differences. Trimethylamine, the least hindered amine gives the highest conversion, but also gives high color and DEG. Diisopropylethylamine, the most hindered amine in the group, gives very low conversion and high DEG. Triethanolamine, a hydroxyl-containing amine, also gives high color and DEG. The weakest base of this group, triphenylamine, gives almost no conversion. The moderately hindered aliphatic tertiary amines, triethylamine, tributylamine and dimethyldodecylamine, gave the best results with triethylamine being the best overall catalyst under these conditions. The unhindered primary amine, benzylamine, gave reasonable conversion, but had very high DEG, and the hindered secondary amine, diisopropyamine, gave poor conversion. The tertiary ammonium hydroxide base, benzyltrimethylammonium hydroxide, gave good conversion, but relatively high DEG. It appears that the successful catalyst here has to be moderately hindered and fairly basic to give the desired properties of high conversion, low DEG and low b*.

Example 2

PET Oligomer Prepared and Converted to Polymer

Terephthalic acid (60 g), toluene (600 g) and triethylamine (1.8 g) were added to a one liter Hastelloy autoclave. The autoclave was purged and pressurized to 500 psi with nitrogen. The autoclave was heated to 200° C., and the pressure was then adjusted to 1500 psi with nitrogen. Ethylene oxide (15.7 g) was added at one time to the autoclave from another pressure vessel which was maintained at 1700 psi of nitrogen. The temperature of the reaction was maintained at 200° C. for 30 minutes and cooled to ambient temperature. A solid esterified TPA was recovered by filtration. Table 2 shows the yield, conversion, b* and mol % DEG of the oligomer formation.

TABLE 2

| Example # | Yield of Solid Esterified TPA | % Conversion | % Yield of esterified oligomer | b* | Mole % DEG |
|---|---|---|---|---|---|
| 2.1 | 64.5 g | 48.4 | 96.8 | 4.70 | 0.8 |
| 2.2 | 68.1 g | 48.3 | 96.6 | 5.68 | 0.8 |
| 2.3 | 63.8 g | 46.2 | 92.4 | 4.18 | 0.7 |
| 2.4 | 57.7 g | 42.8 | 85.6 | 2.16 | 0.6 |

31.9 grams of the esterified oligomer from example 2.3 were then combined with a titanium tetraisopropoxide catalyst (35 ppm in the final polymer) in 3 g of EG. The mixture was heated by the following sequence:

TABLE 3

| Stage | Time (min) | Temp (° C.) | Vacuum (mm) |
|---|---|---|---|
| 1 | 0.1 | 225 | 760 |
| 2 | 5 | 225 | 760 |
| 3 | 2 | 225 | 760 |
| 4 | 60 | 225 | 760 |
| 5 | 20 | 265 | 760 |
| 6 | 10 | 285 | 760 |
| 7 | 1 | 285 | 200 |
| 8 | 2 | 285 | 0.8 |
| 9 | 75 | 285 | 0.8 |

A second example using Sb as the catalyst was completed using the same stages as shown in Table 3. Antimony oxide was dissolved in EG (3 g) and added to the oligomer. The antimony concentration in the polymer was calculated to be 250 ppm. Polyethylene terephthalate was produced having the properties shown in Table 4.

TABLE 4

| Example # | Inherent Viscosity | b* |
|---|---|---|
| 2.5 (titanium catalyst) | 0.835 | 10.7 |
| 2.6 (Sb catalyst) | 0.639 | 8.55 |

Clearly, a high inherent viscosity(IV) PET can be prepared from the partially esterified TPA product produced with ethylene oxide.

Example 3

Using Different Temperatures, Pressures and Amounts of Et$_3$N

Toluene (400 g), terephthalic acid (40 g) and triethylamine were added to a one liter Hastelloy autoclave. The autoclave was purged and pressurized to with nitrogen. The autoclave was heated to the specified temperature and the pressure was increased to the desired level. Ethylene oxide (about 11.5 g) was added at one time to the autoclave from another pressure vessel. The reaction temperature was maintained for 30 minutes and then the autoclave cooled to ambient temperature. The resulting partially esterified TPA product stream was filtered and the solid was weighed. The conversions for each of the examples are given in the table below.

TABLE 5

| Example # | Temp deg C. | Pressure (psi) | Wt % triethylamine | Esterified TPA solid | % Conversion | Mol % DEG in oligomer | b* |
|---|---|---|---|---|---|---|---|
| 3.1 | 260 | 500 | 1.0 | 39.5 | 19.1 | 2.4 | 2.77 |
| 3.2 | 200 | 1500 | 1.0 | 44.4 | 30.1 | 0.6 | 4.24 |
| 3.3 | 230 | 1000 | 2.0 | 43.8 | 28.9 | 0.6 | 0.92 |
| 3.4 | 200 | 500 | 3.0 | 42.0 | 47.0 | 0.9 | 6.64 |
| 3.5 | 200 | 1000 | 2.0 | 43.7 | 39.2 | 0.5 | 3.27 |
| 3.6 | 250 | 1000 | 2.0 | 40.6 | 18.3 | 1.7 | 2.38 |
| 3.7 | 230 | 1000 | 2.0 | 44.0 | 33.1 | 1.0 | 6.97 |
| 3.8 | 230 | 1000 | 2.0 | 44.1 | 32.6 | 0.7 | 1.73 |
| 3.9 | 260 | 1500 | 1.0 | 40.5 | 17.3 | 2.8 | 2.67 |
| 3.10 | 260 | 500 | 3.0 | 38.5 | 18.0 | 2.9 | 2.18 |
| 3.11 | 200 | 500 | 1.0 | 45.2 | 34.1 | 0.6 | 0.85 |
| 3.12 | 230 | 1000 | 2.0 | 41.2 | 27.2 | 0.8 | 1.21 |
| 3.13 | 200 | 1500 | 3.0 | 45.8 | 54.4 | 0.9 | 6.40 |
| 3.14 | 175 | 1000 | 2.0 | 43.1 | 28.2 | 1.0 | 4.19 |
| 3.15 | 260 | 1500 | 3.0 | 38.0 | 29.6 | 3.8 | 5.63 |
| 3.16 | 175 | 1500 | 3.0 | 48.5 | 49.6 | 1.3 | 2.16 |
| 3.17 | 150 | 1000 | 2.0 | 42.3 | 20.4 | 0.7 | 1.43 |
| 3.18 | 260 | 1500 | 3.0 | 39.3 | 24.1 | 2.9 | 2.95 |

Good conversions of esterified TPA were obtained in this entire range of 150-260° C., 1-3 wt % triethylamine, and 500-1500 psi. The highest conversion with this experiment were obtained in the range of 175-200° C. At higher triethylamine levels the percent conversion was relatively insensitive to pressure. The most desirable temperatures from the point of view of continuing to make polymer from the oligomer is in the range of 250 to 280° C. because that is the common range for the early part of the PET production process.

We claim:

1. A process to produce a partially esterified carboxylic acid product said process comprising contacting in a reactor zone at least one dicarboxylic acid with at least one alkylene oxide in the presence of at least one solvent and at least one basic catalyst to produce said partially esterified carboxylic acid product; wherein said alkylene oxide is present in a molar ratio of about 0.5:1 to less than 1:1 alkylene oxide to dicarboxylic acid.

2. The process according to claim 1 wherein said alkylene oxide is present in a molar ratio of about 0.8:1 to less than 1:1 alkylene oxide to dicarboxylic acid.

3. The process according to claim 1 or 2 wherein said alkylene oxide is at least one selected from the group consisting of ethylene oxide, propylene oxide, butylene oxide and mixtures thereof.

4. The process according to claim 3 wherein said dicarboxylic acid is at least one selected from the group consisting of terephthalic acid, isophthalic acid, naphthalene dicarboxylic acid, cyclohexanedicarboxylic acid, cyclohexanediacetic acid, diphenyl-4,4'-dicarboxylic acid, diphenyl-3,4'-dicarboxylic acid, succinic acid, glutaric acid, adipic acid, azelaic acid, sebacic acid, and mixtures thereof.

5. The process according to claim 1 or 2 wherein said alkylene oxide is ethylene oxide and said dicarboxylic acid is terephthalic acid.

6. The process according to claim 1 wherein said reactor zone comprises at least one reactor operated at a pressure such that a substantial portion of the alkylene oxide is in liquid phase.

7. The process according to claim 5 wherein said reactor zone comprises at least one reactor operated at a pressure such that a substantial portion of the ethylene oxide is in liquid phase.

8. The process according to claim 6 wherein said alkylene oxide is ethylene oxide and said dicarboxylic acid is terephthalic acid.

9. The process according to claim 7 wherein said reactor is operated at a temperature of about 120° C. to about 280° C.

10. The process according to claim 6 wherein said reactor is operated at a temperature of about 120° C. to about 280° C.

11. The process according to claim 7 wherein said reactor is operated at a temperature of about 180° C. to about 280° C.

12. The process according to claim 6 wherein said reactor is operated at a temperature of about 180° C. to about 280° C.

13. The process according to claims 1, 2, 4, 6, 7, 8, 9, 10, 11, or 12 wherein said basic catalyst is selected from the group consisting of benzyltrialkyl ammonium hydroxide, tributylamine, triethyl amine, trimethylamine, tripropylamine, tetraalkyl ammonium hydroxide and mixtures thereof.

14. The process according to claim 3 wherein said basic catalyst is selected from the group consisting of tributylamine, triethylamine, trimethylamine, tripropylamine, tetraalkyl ammonium hydroxide and mixtures thereof.

15. The process according to claim 5 wherein said basic catalyst is selected from the group consisting of tributylamine, triethylamine, trimethylamine, tripropylamine, tetraalkyl ammonium hydroxide and mixtures thereof.

16. The process according to claim 13 wherein said solvent comprises at least one selected from the group consisting of toluene and xylene.

17. The process according to claim 13 wherein said solvent comprises at least one oligomeric polyester.

18. The process according to claim 12 wherein said basic catalyst is triethylamine.

19. The process according to claim 1 wherein said partially esterifted carboxylic acid product is subsequently used to produce a polyester product.

20. The process according to claim 19 wherein said dicarboxylic acid is at least one selected from the group consisting of terephthalic acid, isophthalic acid, naphthalene dicarboxylic acid, cyclohexanedicarboxylic acid, cyclohexanediacetic acid, diphenyl-4,4'-dicarboxylic acid, diphenyl-3,4'-dicarboxylic acid, succinic acid, glutaric acid, adipic acid, azelaic acid, sebacic acid, and mixtures thereof.

21. A process to produce a partially esterified terephthalic acid product said process comprising contacting in a reactor zone terephthalic acid with ethylene oxide in the presence of at least one solvent and at least one basic catalyst to produce said partially estenfied terephthalic acid product; wherein said ethylene oxide is present in a molar ratio of about 0.5:1 to less than 1:1 ethylene oxide to terephthalic acid.

22. The process according to claim 21 wherein said ethylene oxide is present in 0.8:1 to less than 1:1 molar ratio ethylene oxide to terephthalic acid.

23. The process according to claim 22 wherein said reactor zone comprises at least one reactor operated at a pressure such that a substantial portion of the ethylene oxide is in liquid phase.

24. The process according to claim 21 wherein said reactor zone comprises at least one reactor operated at a pressure such that a substantial portion of the ethylene oxide is in liquid phase.

25. The process according to claim 24 wherein said reactor is operated at a temperature of about 120° C. to about 280° C.

26. The process according to claim 23 wherein said reactor is operated at a temperature of about 120° C. to about 280° C.

27. The process according to claim 24 wherein said reactor is operated at a temperature of about 180° C. to about 280° C.

28. The process according to claim 23 wherein said reactor is operated at a temperature of about 180° C. to about 280° C.

29. The process according to claims 21, 22, 23, 24, 25, 26, 27 or 28 wherein said basic catalyst is selected from the group consisting of benzyltnalkyl ammonium hydroxide, tributylamine, triethylamine, trimethylamine, tripropylamine, tetraalkyl ammonium hydroxide and mixtures thereof.

30. The process according to claim 29 wherein said solvent comprises at least one selected from the group consisting of toluene and xylene.

31. The process according to claim 29 wherein said solvent comprises at least one oligomeric polyester.

32. The process according to claim 28 wherein said basic catalyst is triethyl amine.

33. The process according to claim 21 wherein said partially esterified terephthalic acid product is subsequently used to produce polyethylene terephthalate.

34. The process according to claim 21 further comprising reacting said partially esterified terephthalic acid product with a diol to produce polyethylene terephthalate.

35. A process to produce polyethylene terephthalate said process comprising:
   (a) contacting in a reactor zone terephthalic acid with ethylene oxide in the presence of a solvent and a basic catalyst to produce a partially esterifted terephthalic acid product; wherein said ethylene oxide is present in a molar ratio of about 0.5:1 to less than 1:1 ethylene oxide to terephthalic acid;
   (b) reacting said partially esterified terephthalic acid product with a diol to produce said polyethylene terephthalate.

36. The process according to claim 35 wherein said reactor zone comprises at least one reactor operated at a pressure such that a substantial portion of the ethylene oxide is in a liquid phase.

37. The process according to claim 35 wherein said reactor is operated at a temperature of about 120° C. to about 280° C.

38. The process according to claim 37 wherein said reactor is operated at about 180° C. to about 280° C.

39. The process according to claim 35, 36, 37, or 38, wherein said basic catalyst is selected from the group consisting of benzyltrialkyl ammonium hydroxide, tributylamine, triethylamine, trimethylamine, tnpropylamine, tetraalkyl ammonium hydroxide and mixtures thereof.

40. The process according to claim 39 wherein said solvent is at least one selected from the group consisting of toluene and xylene.

41. The process according to claim 39 wherein said solvent comprises at least one oligomeric polyester.

42. The process according to claim 41 wherein said basic catalyst is triethylamine.

43. The process according to claim 36 wherein said reacting occurs in a pipe reactor.

44. The process according to claim 36 wherein said diol is selected from the group consisting of ethylene glycol (EG), diethylene glycol, triethylene glycol, 1,4-cyclohexane-dimethanol, propane-1,3-diol, butane-1,4-diol, pentane-1,5-diol, hexane-1,6-diol, neopentylglycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4 tetramethylcyclobutanediol, 2,2-bis-(3-hydroxyethoxyphenyl)-propane, 2,2-bis-(4-hydroxypropoxyphenyl)-propane, isosorbide, hydroquinone, BDS-(2,2-(sulfonylbis)4,1-phenyleneoxy bis(ethanol), and mixtures thereof.

45. The process according to claim 36 wherein said diol comprises ethylene glycol(EG).

46. A process to produce a partially esterified terephthalic acid product said process comprising contacting in a reactor zone terephthalic acid with ethylene oxide in the presence of toulene and triethylamine to produce said partially esterified terephthalic acid product; wherein said ethylene oxide is present in a molar ratio of about 0.5:1 to less than 1:1 ethylene oxide to terephthalic acid; wherein said reactor zone comprises at least one reactor operated a pressure such that a substantial portion of the ethylene oxide is in a liquid phase; and wherein said reactor is operated at a temperature of about 120° C. to about 280° C.

47. A process to produce a partially esterified terephthalic acid product said process comprising contacting in a reactor zone terephthalic acid with ethylene oxide in the presence of toulene and triethylamine to produce said partially esterified terephthalic acid product; wherein said ethylene oxide is present in a molar ratio of about 0.8:1 to less than 1:1 ethylene oxide to terephthalic acid; wherein said reactor zone comprises at least one reactor operated a pressure such a substantial portion of the ethylene oxide is in a liquid phase; and wherein said reactor is operated at a temperature of about 120° C. to about 280° C.

* * * * *

UNITED STATES PATENT AND TRADEMARK OFFICE
CERTIFICATE OF CORRECTION

PATENT NO. : 7,332,548 B2
APPLICATION NO. : 10/793384
DATED : February 19, 2008
INVENTOR(S) : White et al.

Page 1 of 1

It is certified that error appears in the above-identified patent and that said Letters Patent is hereby corrected as shown below:

Column 11, Line 42, Claim 21 "estenfied" should read --esterified--.

Column 12, Line 3, Claim 29 "benzyltnalkyl" should read --benzyltrialkyl--;
Column 12, Line 24, Claim 35 "esterifted" should read --esterified--;
Column 12, Line 43, Claim 39 "tnpropylamine" should read --tripropylamine--.

Signed and Sealed this

Twenty-fourth Day of June, 2008

JON W. DUDAS
*Director of the United States Patent and Trademark Office*